M. L. PARRET.
SHUTTER ADJUSTER FOR MOTION PICTURE MACHINES OR THE LIKE.
APPLICATION FILED JUNE 15, 1921.
1,433,841.
Patented Oct. 31, 1922.
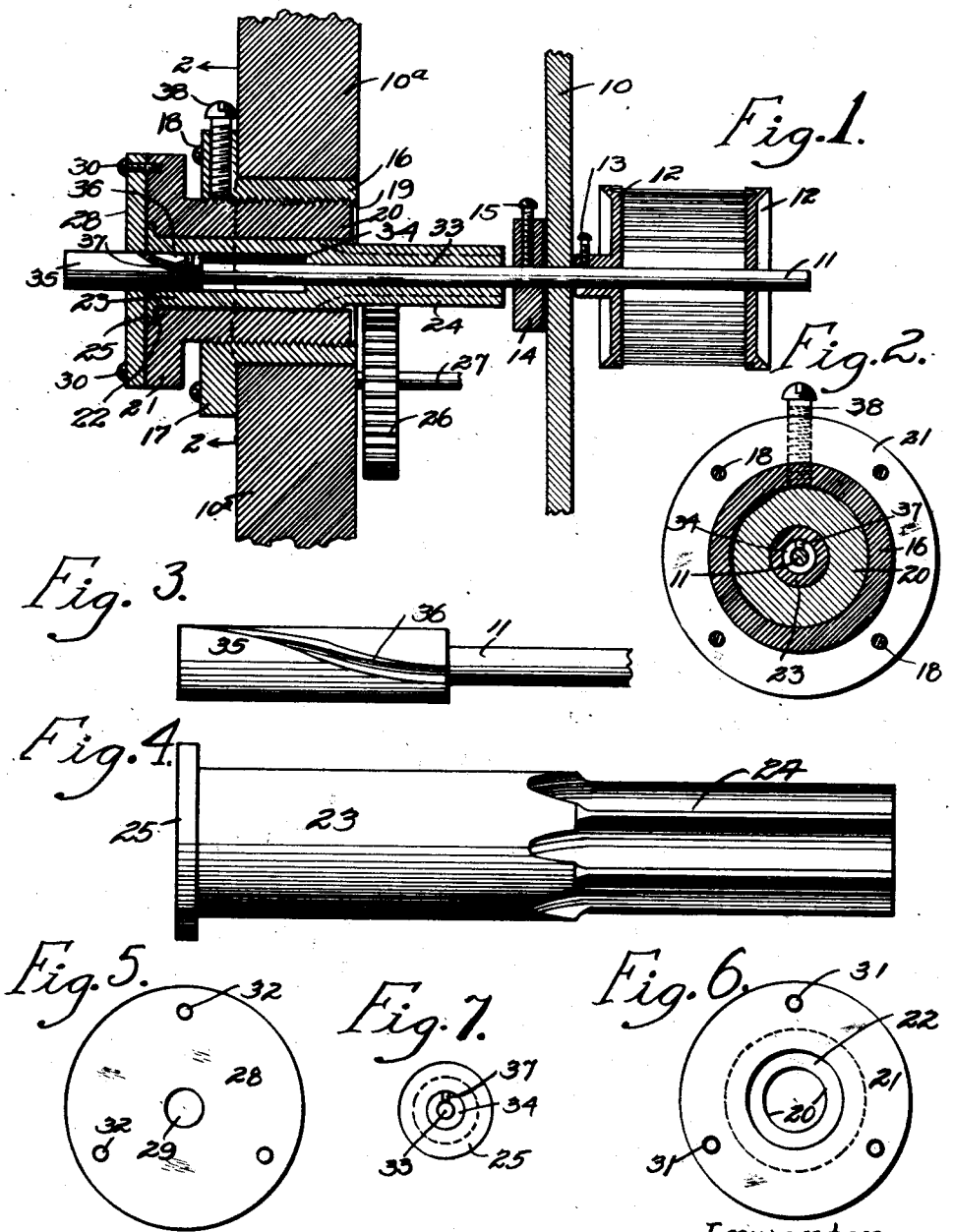

Patented Oct. 31, 1922.

1,433,841

UNITED STATES PATENT OFFICE.

MILTON L. PARRET, OF MARSHALLTOWN, IOWA.

SHUTTER ADJUSTER FOR MOTION-PICTURE MACHINES OR THE LIKE.

Application filed June 15, 1921. Serial No. 477,726.

*To all whom it may concern:*

Be it known that I, MILTON L. PARRET, a citizen of the United States, residing at Marshalltown, in the county of Marshall and State of Iowa, have invented a certain new and useful Shutter Adjuster for Motion-Picture Machines or the like, of which the following is a specification.

The object of my invention is to provide a shutter adjuster for motion picture machines, or the like which is of simple, durable and comparatively inexpensive construction.

More particularly my invention relates to a device whereby the shutter may be rotated slightly independent of the driving mechanism of the motion picture machine for regulating the shutter relative to the film or the picture, for permitting the picture to be properly displayed upon the screen.

Still another object is to provide a device whereby longitudinal movement of the parts thereof will not effect the driving mechanism, but will impart a slight rotary movement to the shutter shaft for regulating the shutter as desired.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a central, sectional view taken through a portion of a picture machine frame, showing my improved adjuster thereon.

Figure 2 is a vertical, sectional view taken on the line 2—2 of Figure 1.

Figure 3 is a side elevation of a portion of the shutter shaft showing the spiral groove thereon.

Figure 4 is a side elevation of the sleeve and elongated gear member.

Figure 5 is a side elevation of one of the plates of my device.

Figure 6 is an end elevation of the housing member of my device; and

Figure 7 is an end elevation of the sleeve shown in Figure 4 of the drawings.

In the accompanying drawings I have used the reference numerals 10 and 10ª to indicate generally portions of a motion picture machine frame. A shutter shaft 11 having a shutter member 12 fixed thereto by means of a set screw or the like 13 is rotatably mounted in the frames 10 and 10ª.

The shutter shaft 11 projects forwardly through the frame 10 as clearly illustrated in Figure 1 of the drawings.

A disc or the like 14 is secured to the shutter shaft 11 by means of a set screw 15. The disc 14 is placed on the opposite side of the frame 10 from the shutter.

From the construction of the parts just described it will be seen that the shutter member will prevent longitudinal movement of the shaft 11 in one direction, while the disc 14 will prevent movement in the opposite direction.

Mounted in the frame 10ª is a sleeve 16 having a flange 17 thereon adapted to rest against one side of the frame 10ª. Screws 18 are extended through the flange 17 for securing the sleeve 16 to the frame 10ª.

The sleeve 16 is interiorly screw threaded as at 19. A housing 20 exteriorly screw threaded is received in the screw threaded interior of the sleeve 16.

The housing 20 is provided with a flange 21 at one end thereof. The flange 21 of the housing 20 is provided with an annular rabbet 22, the purpose of which will be hereinafter more fully set forth.

A sleeve member 23 having an elongated gear 24 thereon at one end thereof and a flange 25 at the other end thereof is rotatably mounted within the housing 20. The flange 25 being received in the annular rabbet 22 while the elongated gear 24 projects forwardly beyond the end of the housing 20.

A main drive gear 26 mounted on the shaft 27 is designed to mesh with the elongated gear 24 for rotating the same.

A plate 28 having an opening 29 therein is secured to the flange 21 of the housing 20 by means of the screws 30. The plate 28 rests against one end of the sleeve 23.

The flange 21 of the housing 20 is provided with screw threaded openings 31 for receiving the screws 30, while the plate 28 is provided with openings 32 through which the screws 30 are extended.

The sleeve 23 is provided with an opening or bore 33 of substantially the same diameter as the shaft 11 and is also provided with an enlarged opening 34 as clearly illustrated in Figure 1 of the drawings.

The opening or bore 34 is of substantially the same size as the opening 29 in the plate 30.

The shutter shaft 11 is provided with an enlarged portion 35 having a spiral groove 36 therein. The sleeve 23 has a pin member 37 received in the spiral groove 36.

From the construction of the parts just described and as clearly illustrated in Figure 1 of the drawings it will be seen that rotation of the gear 26 will impart rotation to the sleeve member 23, which by means of the connection between the pin member 37 and the enlarged portion 35 of the shaft 11 will impart rotation to the shutter.

The entire housing member 20 together with the sleeve 23 and plate 28 may be moved longitudinally within the sleeve 16.

Rotation of the housing 20 due to the co-acting screw threads 19 of the sleeve 16 in the screw threaded portion of the housing 20 causes the longitudinal movement of the parts just mentioned.

It will be seen that the movement longitudinal of the housing 20 will cause the sleeve 23 to be moved therewith. The gear 26 will mesh during the entire longitudinal movement of the sleeve 23 with the elongated gear 24.

The travel of the pin member 37 in the spiral groove 36 will cause the shutter shaft 11 to be rotated slightly independently of the remaining parts of the device. This slight rotation permits the shutter member 12 to be placed in proper position relative to the film or picture desired to be thrown upon the screen.

A set screw 38 is mounted in the sleeve 16 and is designed to co-act with the housing 20 for locking it against any undesired rotation.

It will be understood that the shaft 11 can not move longitudinally so therefore movement of the pin member longitudinally will cause it to travel with the groove 36 for rotating the shaft independently of the main drive gear 26. The pin 37 also serves as a means of transmitting power from the gear 26 to the shutter shaft 11.

It will be seen that I have provided a device whereby the shutter shaft may be adjusted while the machine is in operation and without interfering with the remaining parts of the device.

The flange 25 of the sleeve 23 being received in the rabbet 22 permits rotary movement of the sleeve 23 independently of the housing 20, but any longitudinal movement of the housing 20 will impart a similar movement to the sleeve 23.

It will be seen that I have provided a very efficient and easily operated shutter adjustment for motion picture machines.

Some changes may be made in the construction and arrangement of the parts of my machine without departing from the real spirit and purpose of my invention, and it is my intention to cover by my claims, any modified forms of structure or use of mechanical equivalents which may be reasonably included within their scope.

I claim as my invention:

1. In a device of the class described, a frame, a housing mounted thereon having a screw-threaded connection therewith, a sleeve rotatably mounted in said housing and adapted to slide longitudinally therewith when the housing is screwed inwardly or outwardly, a shaft rotatably mounted in said sleeve, means for holding said shaft against longitudinal movement, said sleeve and shaft having means for operatively connecting them, comprising a pin and spiral slot structure, whereby longitudinal movement of the housing and the sleeve carried thereby will effect rotary movement of said shaft.

2. In a device of the class described, a frame, a housing mounted thereon having a screw-threaded connection therewith, adjustable means for locking said housing to the frame, a sleeve rotatably mounted in said housing and adapted to slide longitudinally therewith when the housing is screwed inwardly or outwardly, a shaft rotatably mounted in said sleeve, means for holding said shaft against longitudinal movement, said sleeve and shaft having means for operatively connecting them, comprising a pin and a spiral slot structure, whereby longitudinal movement of the housing and the sleeve carried thereby will effect rotary movement of said shaft.

3. A shutter adjuster for a motion picture machine or the like comprising a frame element a shutter operating shaft, a sleeve for receiving a portion of said shaft, means comprising a pin and spiral slot-structure for connecting said shaft and sleeve together whereby they may rotate in unison, a housing, said sleeve being rotatably but non-slidably received in said housing, with a portion projected out therefrom, said projected portion being provided with gear teeth of substantial width, a gear in mesh with said gear teeth for rotating said sleeve, said housing being adjustable whereby said sleeve may be slid longitudinally for causing said shaft to be rotated relative to said sleeve as and for the purposes stated.

4. In combination with a motion picture machine frame and a shutter device therefor means for adjusting the shutter device, said means including a shaft on which said shutter device is mounted, a housing having a screw threaded portion thereon received in said frame, a sleeve rotatably mounted in said housing, said sleeve having a pin therein, a spiral groove in said shaft, said shaft being received in said sleeve and said pin in said groove whereby rotating of said sleeve will impart similar rotation to said shaft, the parts being so arranged that movement of said housing longtudinally will impart a slight rotary movement of said shaft relative to said sleeve due to the travel of the pin in the spiral groove.

5. In combination with a motion picture machine frame and a shutter device therefor means for adjusting the shutter device, said means including a shaft on which said shutter device is mounted, a housing having a screw threaded portion thereon received in said frame, a sleeve rotatably mounted in said housing, said sleeve having a pin therein, and gear teeth formed thereon of substantial width, a drive gear adapted to mesh with said gear teeth independent of the sliding movement of the sleeve, a spiral groove in said shaft, said shaft being received in said sleeve and said pin in said groove whereby rotation of said sleeve will impart similar rotation to said shaft, the parts being so arranged that movement of said housing and sleeve longitudinally will impart a slight rotary movement of said shaft relative to said sleeve due to the travel of the pin in the spiral groove.

6. The combination of a motion picture machine shutter and a shaft therefor, an elongated gear on said shaft, a main drive gear in mesh with said elongated gear, means for operatively connecting said elongated gear and said shaft together, for causing them to operate in unison, said means being adjustable and including a pin member fixed to said elongated gear and a spiral groove in said shaft for receiving said pin member whereby longitudinal movement of the elongated gear or shaft relative to each other will cause rotation of them relative to each other for the purposes stated.

Des Moines, Iowa, June 1st, 1921.

MILTON L. PARRET.